United States Patent [19]

Tabbane

[11] Patent Number: 5,519,758
[45] Date of Patent: May 21, 1996

[54] RADIOTELEPHONIC PROCESS FOR LOCATING MOBILE SUBSCRIBERS AND A RADIOTELEPHONE INSTALLATION FOR IMPLEMENTING THE PROCESS

[75] Inventor: Sami Tabbane, Paris, France

[73] Assignee: France Telecom, Paris, France

[21] Appl. No.: 240,513

[22] Filed: May 11, 1994

[30] Foreign Application Priority Data

May 11, 1993 [FR] France .................................. 93 05659

[51] Int. Cl.$^6$ ..................................................... H04Q 7/22
[52] U.S. Cl. ............................ 379/59; 379/60; 455/33.1; 455/33.2
[58] Field of Search ...................... 379/59, 60; 455/33.1, 455/33.2, 33.4, 54.1, 56.1

[56] References Cited

U.S. PATENT DOCUMENTS

| | | | |
|---|---|---|---|
| 5,095,531 | 3/1992 | Ito ............................................ | 455/33.1 |
| 5,305,466 | 4/1994 | Taketsugu ................................ | 455/33.1 |
| 5,327,575 | 7/1994 | Menich et al. .......................... | 455/33.2 |
| 5,390,234 | 2/1995 | Bar-Noy et al. ......................... | 379/59 |

FOREIGN PATENT DOCUMENTS 0139433  6/1988  Japan ...................................... 379/60

OTHER PUBLICATIONS

Electronic Industries Association, "Cellular Radio–telecommunications Intersystem Operations: Intersystem Handoff", Feb. 1991.

*Primary Examiner*—Curtis Kunz
*Assistant Examiner*—William Cumming
*Attorney, Agent, or Firm*—Foley & Lardner

[57] ABSTRACT

In a radiotelephonic process for locating mobile subsribers, a profile is created from data recorded in a recording means in the form of a first work file and obtained during the movements of a particular mobile subscriber during a first predetermined observation period, the data relates to a plurality of daily chronological periods spanning the first observation period and each period has a start determined by the time at which the mobile subscriber entered a location zone with a particular daily identity, and an end determined by the time at which the mobile subscriber left the location zone and entered another location zone with a different identiy. There is also disclosed a radiotelephonic installation for carrying out the process.

3 Claims, 5 Drawing Sheets

| L1 | |
|---|---|
| <00:00, 07:45> | (Orsay, 0) |
| <07:45, 07:50> | (Orsay, 0) |
| <07:50, 07:55> | (Orsay, 0) |
| <07:55, 08:00> | (Massy, 0) |
| <08:00, 08:05> | (Massy, 0) |
| <08:05, 08:10> | (Massy, 0) |
| <08:10, 08:15> | (Massy, 0) |
| <08:15, 08:30> | (Denfert, 0) |
| <08:30, 08:40> | (Denfert, 0) |
| <08:40, 08:45> | (Halles, 0) |
| <08:45, 09:00> | (Halles, 0) |
| <09:00, 17:50> | (Defense, 0) |
| <17:50, 18:00> | (Halles, 0) |
| <18:00, 18:15> | (Defense, 0) |
| <18:15, 18:30> | (Denfert, 0) |
| <18:30, 18:35> | (Denfert, 0) |
| <18:35, 18:45> | (Denfert, 0) |
| <18:45, 18:50> | (Massy, 0) |
| <18:50, 19:00> | (Massy, 0) |
| <19:00, 19:15> | (Denfert, 0) |
| <19:15, 19:30> | (Massy, 0) |
| <19:30, 19:40> | (Massy, 0) |
| <19:40, 23:59> | (Orsay, 0) |

<PCo> (Zo, r=0)

FIG. 4B

| L2 | |
|---|---|
| <00:00, 07:45> | (Orsay, 5) |
| <07:45, 07:50> | (Orsay, 4)(Massy, 1) |
| <07:50, 07:55> | (Orsay, 2)(Massy, 3) |
| <07:55, 08:00> | (Massy, 5) |
| <08:00, 08:05> | (Massy, 4)(Denfert, 1) |
| <08:05, 08:10> | (Massy, 2)(Denfert, 3) |
| <08:10, 08:15> | (Massy, 1)(Denfert, 4) |
| <08:15, 08:30> | (Denfert, 5) |
| <08:30, 08:40> | (Denfert, 3)(Issy,1)(Halles, 1) |
| <08:40, 08:45> | (Halles, 2)(Issy, 3) |
| <08:45, 09:00> | (Halles, 1)(Issy, 3)(Defense, 1) |
| <09:00, 17:50> | (Defense, 2)(Issy, 3) |
| <17:50, 18:00> | (Halles, 1)(Issy, 3)(Defense, 1) |
| <18:00, 18:15> | (Defense, 1)(Issy, 3)(Denfert, 1) |
| <18:15, 18:30> | (Denfert, 3)(Issy, 1)(Halles, 1) |
| <18:30, 18:35> | (Denfert, 3)(Massy, 1)(Halles, 1) |
| <18:35, 18:45> | (Denfert, 2)(Massy, 2)(Halles, 1) |
| <18:45, 18:50> | (Denfert, 1)(Massy, 3)(Halles, 1) |
| <18:50, 19:00> | (Massy, 3)(Denfert, 1)(Halles, 1) |
| <19:00, 19:15> | (Massy, 2)(Orsay, 1)(Denfert, 2) |
| <19:15, 19:30> | (Denfert, 1)(Orsay, 2)(Massy, 2) |
| <19:30, 19:40> | (Massy, 3)(Orsay, 2) |
| <19:40, 23:59> | (Massy, 1)(Orsay, 4) |
| | (Orsay, 5) |

<PCo> (Zr1, r1)(Zr2, r2)

FIG. 4C

| L3 | |
|---|---|
| <00:00, 07:45> | (Orsay, 1.0) |
| <07:45, 07:50> | (Orsay, 0.8)(Massy, 0.2) |
| <07:50, 07:55> | (Massy, 0.6)(Orsay, 0.4) |
| <07:55, 08:00> | (Massy, 1.0) |
| <08:00, 08:05> | (Massy, 0.8)(Denfert, 0.2) |
| <08:05, 08:10> | (Denfert, 0.6)(Massy, 0.4) |
| <08:10, 08:15> | (Denfert, 0.8)(Massy, 0.2) |
| <08:15, 08:30> | (Denfert, 1.0) |
| <08:30, 08:40> | (Denfert, 0.6)(Issy, 0.2)(Halles, 0.2) |
| <08:40, 08:45> | (Issy, 0.6)(Halles, 0.4) |
| <08:45, 09:00> | (Issy, 0.6)(Halles, 0.2)(Defense, 0.2) |
| <09:00, 17:50> | (Issy, 0.6)(Defense, 0.4) |
| <17:50, 18:00> | (Issy, 0.6)(Halles, 0.2)(Defense, 0.2) |
| <18:00, 18:15> | (Issy, 0.6)(Defense, 0.2)(Denfert, 0.2) |
| <18:15, 18:30> | (Denfert, 0.6)(Issy, 0.2)(Halles, 0.2) |
| <18:30, 18:35> | (Denfert, 0.6)(Massy, 0.2)(Halles, 0.2) |
| <18:35, 18:45> | (Denfert, 0.4)(Massy, 0.4)(Halles, 0.2) |
| <18:45, 18:50> | (Massy, 0.6)(Denfert, 0.2)(Halles, 0.2) |
| <18:50, 19:00> | (Massy, 0.4)(Denfert, 0.4)(Orsay, 0.2) |
| <19:00, 19:15> | (Orsay, 0.4)(Massy, 0.4)(Denfert, 0.2) |
| <19:15, 19:30> | (Massy, 0.6)(Orsay, 0.4) |
| <19:30, 19:40> | (Orsay, 0.8)(Massy, 0.2) |
| <19:40, 23:59> | (Orsay, 1.0) |

<PCo> (Zr1, p1)(Zr2, p2)

RADIOTELEPHONIC PROCESS FOR LOCATING MOBILE SUBSCRIBERS AND A RADIOTELEPHONE INSTALLATION FOR IMPLEMENTING THE PROCESS

BACKGROUND OF THE INVENTION

1. Field of the Invention

The present invention relates to the radiotelephony field.

It finds a general application in the location of mobile subscribers in a radiotelephone installation, and more particularly in a radiotelephone installation of the MSG (Mobile Special Group) type.

2. Description of the Related Art

Generally speaking, a radiotelephonic process for locating mobile subscribers comprises the following steps:

a) provision of at least one mobile telephone set for a predetermined mobile subscriber having a predetermined mobile subscriber identity, the said mobile telephone set being intended to be in intercommunication with fixed telephone sets connected to a fixed telephone communication network;

b) provision of a plurality of geographic location zones, each having radio coverage from at least one base station, and each location zone having a predetermined identity;

c) provision of recording means connected to the base stations and containing data relating to the identity of the subscriber and to the identity of the current location zone of the mobile telephone set;

d) at the recording means, creation of a profile for the mobile subscriber composed of a list of couplets (Zi, fi) where Zi is a location zone identity and fi represents a function with at least one predetermined operand giving the probability of locating the subscriber in the location zone Zi at a given instant, and storage of the said profile thus created in the recording means;

e) after storage of the profile, in response to a telephone call request directed to the mobile subscriber, interrogation of the recording means in order to select from the profile in accordance with the operand at least the location zone identity assigned the highest probability, and the broadcast of a search message in the location zone with the identity thus selected;

f) in the event of positive location, at the mobile telephone set, reception of the search message and, in response, the establishing of radiotelephone intercommunication with the caller, while in the event of negative location, the broadcasting of the search message in another location zone, if necessary (JP-A-62 299 123; JP-A-31 31 131).

SUMMARY OF THE INVENTION

An object of the invention is to solve the problem of creating such a profile cheaply and easily.

This aim is achieved in a process of the type mentioned above, by the improvement wherein provision is made for creating the profile from data recorded in the recording means, in the form of a first work file, and obtained during the movements of a particular subscriber during a first predetermined observation period, the said data relating to a plurality of daily chronological periods spanning the first observation period and each having a start determined by the time at which the mobile subscriber entered a location zone with a particular daily identity, and an end is determined by the time at which the said mobile subscriber left the location zone with a particular daily identity and entered another location zone.

In practice, provision is made to execute an algorithm for processing data contained in the first work file comprising the following steps:

i) the construction, from the start and end times of the various daily chronological periods in the first work file, of a list of successive weekly chronological periods, the first weekly chronological period having a start of value greater than or equal to 00:00 and an end corresponding to the end of the daily chronological period having the smallest value among those of the end times of the daily chronological periods of the first work file, and the last weekly chronological period having an end of value less than or equal to 23:59 and a start corresponding to the start of the daily chronological period having the largest value among those of the start times of the daily chronological periods of the first work file, the daily identity of the location zone of the corresponding daily chronological period being assigned to each weekly chronological period;

ii) by searching the data of the first work file, obtaining the different location zone daily identities assigned for each weekly chronological period thus constructed;

iii) the counting of the recurrence of each location zone daily identity for each weekly chronological period; and iv) the ordering of the different location zone daily identities according to their recurrence for each weekly chronological period.

Advantageously, the process also comprises the following stages:

the construction, in the mobile telephone set operating mode, of a second work file, substantially similar to the first work file, and containing data relating to the daily chronological periods and to the location zone daily identities recorded in the recording means during a second predetermined period which follows the first observation period and not recorded in the first work file during the said first observation period; and the processing of these new data in accordance with steps i to iv in order to update the profile.

Another object of the present invention is a radiotelephone installation for implementing the process according to the invention.

Other characteristics and advantages of the invention will emerge in the light of the detailed description below and the accompanying drawings in which:

BRIEF DESCRIPTION OF THE DRAWINGS

FIG. 2 is a table illustrating the construction of an example of a work file according to the invention;

FIGS. 4A, 4B and 4C are tables illustrating the steps of creating the profile from the work file of FIG. 2 according to the invention;

FIGS. 5A and 5B illustrate an example of updating the profile according to the invention.

DESCRIPTION OF THE PREFERRED EMBODIMENTS

Figure 1:
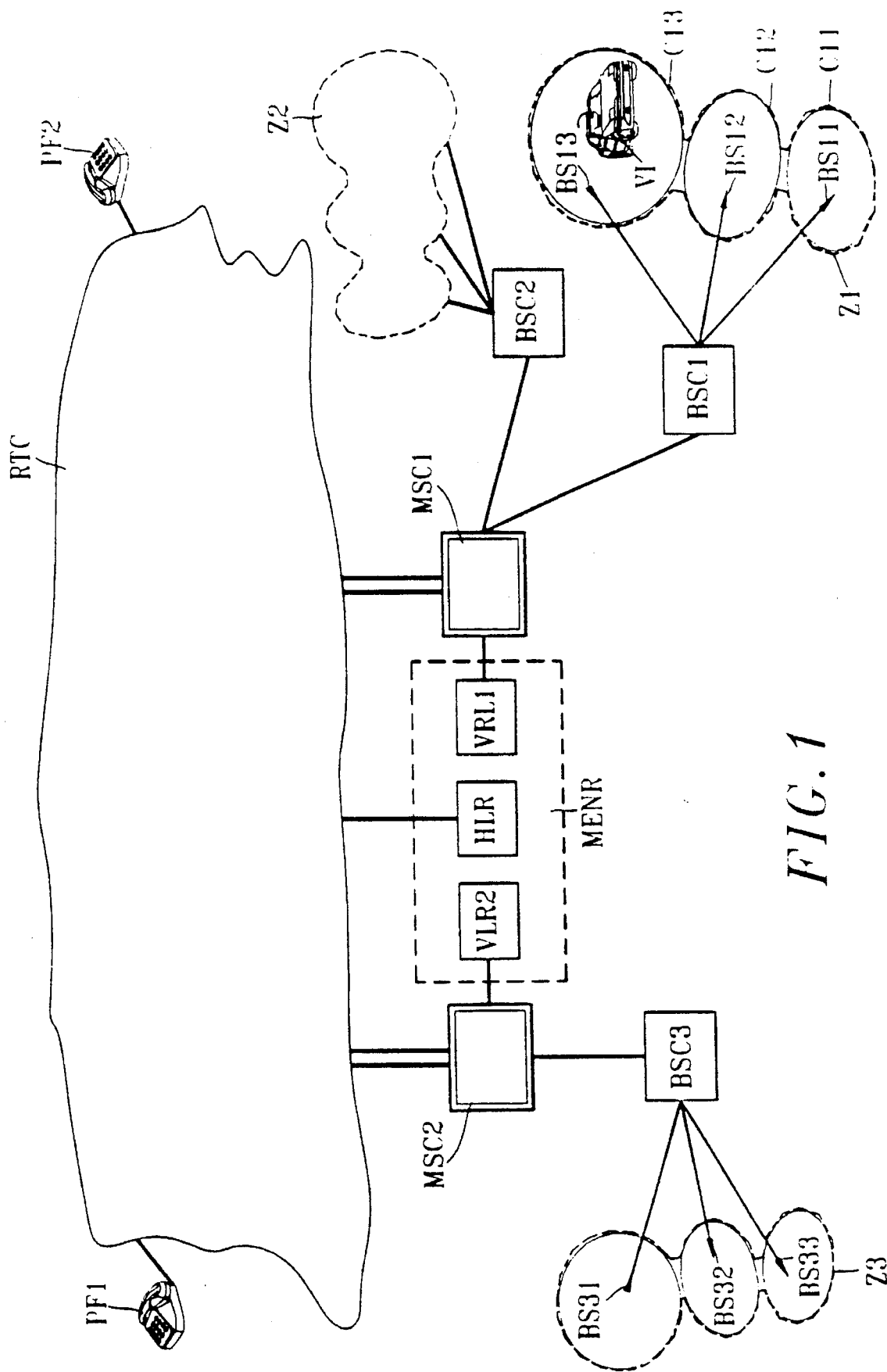
FIG. 1 shows schematically an MSG type radiotelephone installation.

FIG. 1 shows an architecture of a radiotelephone installation according to the invention, of the MSG (Mobile Special Group) type, for example.

It is constructed around a mobile telephone set MS intended to be in intercommunication with fixed telephone sets PF1, PF2 connected to a fixed telephone communication network RTC, for example the public switched telephone network.

In an MSG type installation, the mobile telephone set MS, here accommodated in a vehicle VI, is assigned to a mobile subscriber having an international mobile-subscriber identity known as IMSI, standing for "International Mobile Subscriber Identity".

The radio coverage zone of the installation is partitioned into a plurality of location zones Z1, Z2, Z3, each being given radio coverage by a plurality of base stations, BS11 to BS13 for the location zone Z1, BS21 to BS23 for the zone Z2 and BS31 to BS33 for the location zone Z3.

The radiotelephone installation is known as cellular since a radio cell is assigned to each base station BS, for example C11 for the base station BS11, C12 for the base station BS12 and C13 for the base station BS13. The juxtaposition of the cells C11 to C13 here constitutes the location zone Z1.

In practice, a location zone identity Za is assigned to each location zone with an integer number varying from 1 to a, where a is the location zone number. This identity is transmitted periodically on a predetermined channel by all the base stations situated in the corresponding location zone.

It should be noted that one or more base stations are associated with a location zone.

Recording means MENR are connected to the pluralities of base stations BS by way of routing means MACH which will be described in more detail below.

The recording means MENR contain data relating in particular to the subscriber identity IMSI and to the identity of the current location zone, here Z1 for the mobile set MS.

The routing means MACH are connected to the pluralities of base stations BS, to the fixed telephone communication network RTC and to the recording means MENR.

They comprise suitable interrogation means (not shown) to interrogate the recording means, in response to a telephone call request directed to the mobile subscriber (incoming call), in order to obtain the identity of the current location zone of the subscriber thus requested, and suitable broadcast means (not shown) to broadcast a search message in each base station in the said location zone the identity of which has been thus obtained.

In the event of positive location in the said location zone, that is to say in the case where the mobile set MS is in the location zone the identity of which has been thus obtained, the mobile telephone set receives the search notification message and in response establishes radiotelephonic intercommunication with the caller.

The detailed structure of the routing means MACH is described in the journal ECHO DES RECHERCHES No 131, 1st quarter 1988 "The European digital cellular system for communication with mobiles".

Essentially, these routing means MACH comprise:
a plurality of base station controllers BSC1 to BSC3 each connected to a plurality of base stations of a predetermined location zone, for example the controller BSC1 is connected to the base stations BS11, BS12 and BS13 of the location zone Z1;
a plurality of mobile service switching centres MSC1, MSC2, each connected to the fixed telephone communication network RTC on the one hand and to a plurality of controllers BSC on the other.

For example, the mobile service switching centre MSC1 manages the controllers BSC1 and BSC2 while the mobile service switching centre MSC2 manages the controller BSC3.

In short, a base station controller BSC provides control of one or more base stations BS and acts as a link between the base stations BS and the mobile service switching centre MSC. As for the mobile service switching centre MSC, this provides interoperation of the cellular radio installation with the fixed telephone communication network RTC.

In an MSG type installation, the recording means comprise a nominal location register known as HLR, standing for "Home Location Register", and a plurality of visitor location registers known as VLR, standing for "Visitors Location Register", each associated with one or more mobile service switching centres.

The visitor location register VLR1 is here associated with the mobile service switching centre MSC1 while the visitor location register VLR2 is associated with the mobile service switching centre MSC2.

In short, the nominal location register HLR is a database which contains the data necessary for the management of telephone calls from a number of mobile subscribers.

Essentially, these data are the subscriber identity IMSI, his directory number, the basic services and the supplementary services to which he is entitled, possible restrictions of services, etc.

These data are updated according to changes of subscription characteristics. They are therefore almost static.

The database also contains a dynamic part which corresponds to location data (current location zone identity) for each mobile subscriber concerned, data necessary for the routing of communications arriving for these subscribers (incoming calls). These data are managed in the form of a re-routing number by means of the current visitor location register.

A visitor location register VLR contains a copy of the contents of the nominal location register for all mobile subscribers who are in the cells dependent on its switching centres MSC.

For example, the visitor location register VLR1 contains a copy of a part of the contents of the HLR for all mobile subscribers who are in the cells dependent on the switching centre MSC1.

Thus the visitor location register VLR1, on request from the nominal location register HLR, supplies the corresponding data to the mobile service switching centre MSC1 when processing outgoing and incoming calls of these subscribers.

The visitor location register VLR also contains, for all its subscribers, location data in the form of an identity of the location zone in which it is situated.

Finally, the visitor location register VLR is the functional component which allocates the re-routing numbers and transmits them to the nominal location register HLR.

Furthermore, provision is made for creating, at the recording means, a profile for each mobile subscriber composed of a list of couplets $(Z_i, f_i)$ where $Z_i$ is a location zone identity and fi represents a function with at least one predetermined operand giving the probability of locating the subscriber in the location zone $Z_i$ at a given instant and of storing the said profile thus created in the recording means.

After storage of the profile, in response to a telephone call request directed to the mobile subscriber, provision is made for interrogating the recording means in order to select from the profile according to the predetermined operand at least the identity of the location zone having the highest probability and to broadcast the search message in the location zone thus selected.

In the event of positive location, provision is made, at the mobile telephone set, for receiving the search message and in response establishing radiotelephonic intercommunication with the caller, while in the event of negative location, provision is made for broadcasting the search message in another location zone if necessary.

Creation of the profile relies on the known process in which, in the event of change of location zone, the mobile telephone set gains attention from the corresponding base station by communicating the identity of the subscriber to it, while the new location zone thus signalled is recorded in the recording means in association with the identity of the mobile subscriber and the time at which the change of location zone is made.

According to the invention, provision is made for creating the profile from data recorded in the recording means in the form of a work file STAT and obtained during the movements of a particular mobile subscriber during a predetermined observation period.

Figures 2, 5A, 5B:
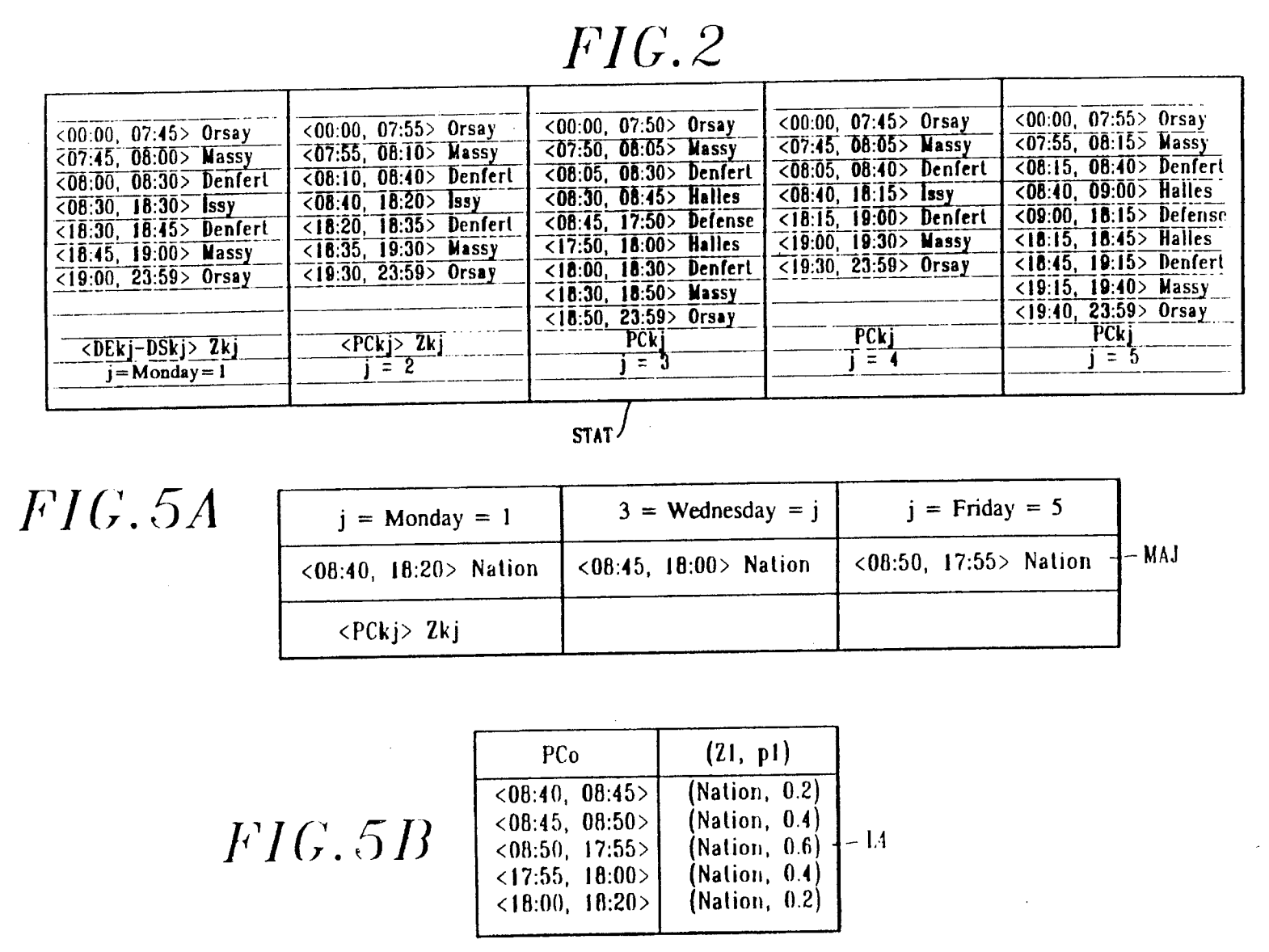

With reference to FIG. 2, the data contained in the work file STAT comprise a plurality of daily chronological periods $PC_{kj}$ spanning the observation period, for example 5 days, with k variable from 00:00 to 23:59 and j variable from 1 to 5 and initialised to 1 for Monday (j could have a different value, for example 31).

Each daily chronological period $PC_{kj}$ has a start $DE_{kj}$ determined by the time at which the mobile subscriber entered a location zone of identity $Z_{k-1j}$ and an end $DS_{kj}$ determined by the time at which the mobile subscriber left the location zone of identity $Z_{k-1j}$ and entered the location zone of identity $Z_{kj}$.

In the example illustrated in FIG. 2, during the daily chronological period $PC_{kj}$ <00:00, 07:45> with j=1=Monday and k=07:45, the subscriber was in the location zone of identity $Z_{kj}$= ORSAY, while during the following daily chronological period $PC_{k+1j}$ <07:45, 08:00>, with j=1 and k+1=08:00, he was in the location zone of identity $Z_{k+1j}$= Massy.

Next, provision is made for executing an algorithm for processing data contained in the work file STAT comprising the following steps:

i) from the various daily chronological periods $PC_{kj}$ of the work file STAT, the construction of a list L1 of successive weekly chronological periods PCo (or monthly where j is equal to 31) the first weekly chronological period PCo having a start DEo of value greater than or equal to 00:00 and an end DSo corresponding to the end time $DS_{kj}$ of the daily chronological period $PC_{kj}$ having the smallest value among those of the end times of the daily chronological periods of the first work file STAT, and the last weekly chronological period having an end DSo of value less than or equal to 23:59 and a start DEo corresponding to the start time $DE_{kj}$ of the daily chronological period $PC_{kj}$ having the largest value among the start times of the daily chronological periods of the first work file STAT, the daily identity Zo of the location zone of the corresponding daily chronological period $PC_{kj}$ being assigned to each weekly chronological period;

ii) by searching the work file STAT, obtaining the different location zone daily identities assigned for each weekly chronological period;

iii) counting the recurrence of each location zone daily identity for each weekly chronological period thus constructed; and iv) ordering the different location zone daily identities according to their recurrence for each weekly chronological period.

Figure 3:
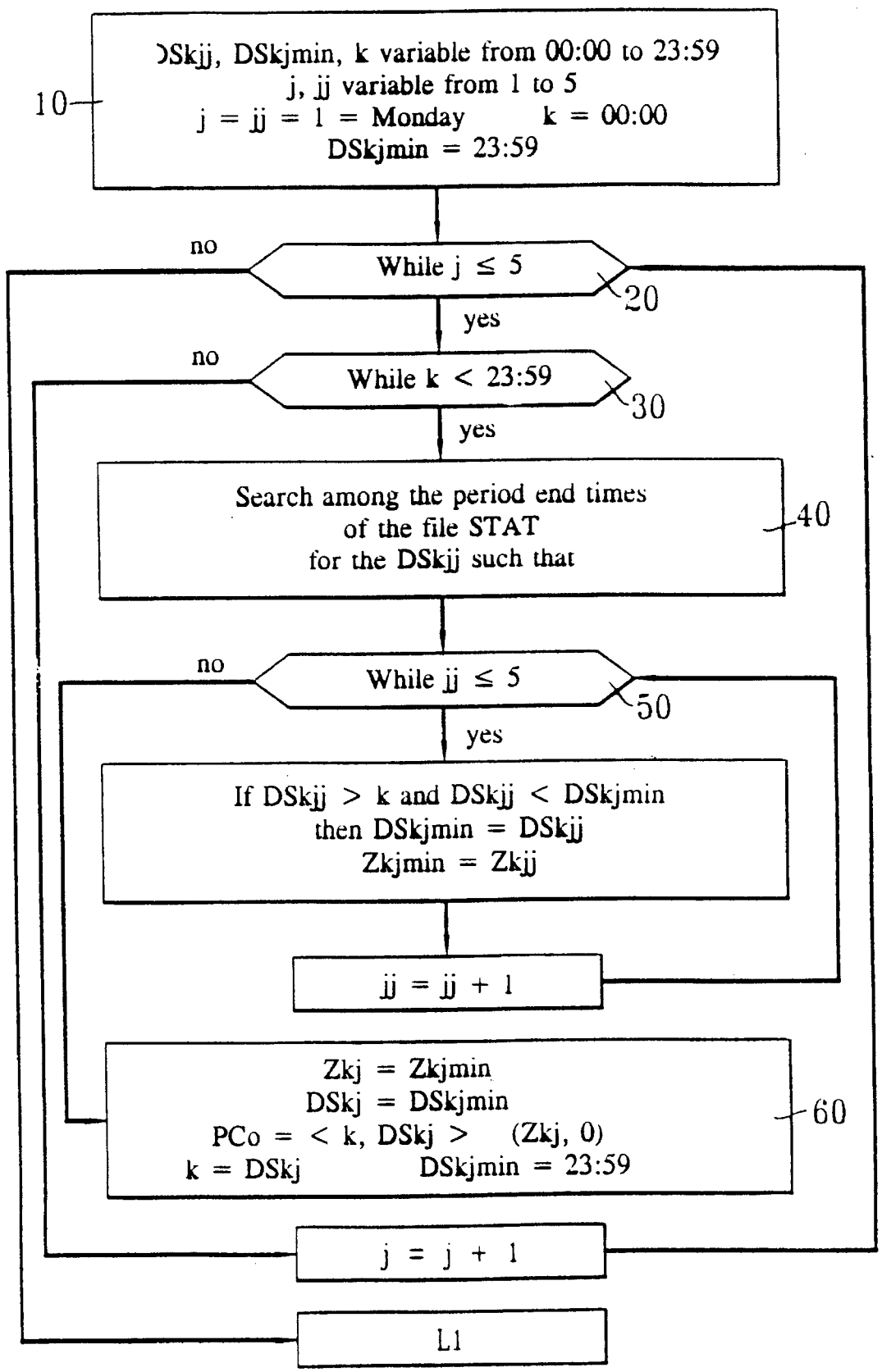
FIG. 3 is a flowchart illustrating the step relating to the construction of the different chronological periods according to the invention.

More precisely, the algorithm relating to step i) is illustrated in FIG. 3, and the list L1 obtained by this algorithm is shown in FIG. 4A.

In short, the first operation 10 concerns initialisation of the variables k, j, jj, $DS_{kjj}$, $DS_{kjmin}$.

In operation 10, the variable k is initialised to 00:00, j to 1 (Monday), jj to 1, and $DS_{kjmin}$ to 23:59.

At operation 20, a first loop is executed while the variable j is less than or equal to 5.

At operation 30, a second loop is executed while the variable k is less than 23:59.

Operation 40 comprises in particular a third loop 50 which is executed while the variable jj is less than or equal to 5 and in which, among the end times of the daily chronological periods of the file STAT, the one which is greater than k and which is the smallest among them ($DS_{kjj}$<$DS_{kjmin}$) is searched for.

Once $DS_{kjj}$ has been found, $DS_{kjmin}$ is set=$DS_{kjj}$ and the identity $Z_{kjmin}$ is set=$Z_{kjj}$ and the variable jj is incremented by 1.

At step 60, the daily identity $Z_{kj}$ corresponding to the $DS_{kjj}$ thus found is stored. The value of the current time $DS_{kj}$ is assigned to the variable k and, in the daily chronological period PCo of start DEo equal to K and of end equal to $DS_{kj}$, the corresponding identity Zo, accompanied by a recurrence r of value 0, is stored.

When the variable k is greater than 23:59, the variable j is incremented by 1.

At the end of the first loop, a list L1 as shown in FIG. 4A is obtained.

In the example illustrated in FIG. 4A, the first weekly chronological period PCo <00:00–07:45> is assigned the daily identity location zone Orsay with a recurrence r of value 0. The following weekly chronological period PCo+1 <07:45 to 07:50> is assigned the daily identity location zone Orsay with a recurrence r of value 0.

After obtaining the list L1 containing the weekly (or monthly or other) chronological periods, step ii) is carried out.

In short, in this step ii), for each weekly chronological period PCo of the list L1, provision is made for searching the file STAT and storing the location zone daily identities assigned with their recurrence r during the said weekly chronological period.

Next, at step iii), the recurrence of each daily identity for each daily chronological period is counted.

A list L2 (FIG. 4B) of successive weekly chronological periods is obtained, each assigned with a list of identification zone daily identities with their recurrence r.

Finally, at step iv), the location zone daily identities for each weekly chronological period (list L3, FIG. 4C) are classified by decreasing probability p.

Here, probability p means the ratio of the recurrence r of the location zone identity concerned to the sum of all the recurrences of the location zone identities.

Preferably, in list L3 provision is made for keeping, classified in this way, only the location zone daily identities having a probability greater than a predetermined threshold.

Advantageously, this threshold is determined as a function of the characteristics of the mobile subscriber, and the costs of updating location and searching for subscribers. It may, for example, be 20%.

The profile or list L3 thus obtained comprises a list of couplets (Zi, fi) where Zi is a location zone identity and fi is a function with one operand (in this case, time) giving the probability of locating the telephone set in the identity zone Zi at a given instant.

A daily and/or weekly chronological period is coded over 4 octets.

The probability associated with a location zone daily identity is coded over 2 octets.

A daily chronological period corresponding to a given day (workday, Saturday, Sunday, etc) requires at most (in the example) 16 octets.

Where each day comprises 25 daily chronological periods and if 10 different days (workdays, Saturdays, etc) are distinguished, the profile or list L3 of a mobile subscriber comprises around 4000 octets, that is 32 kbits for storage of the profile L3.

In the case of an observation period of the order of 15 days for each subscriber, the average size of the work file STAT is of the order of 900 octets, that is 72 kbits.

The additional memory size for managing a subscriber with the radiotelephonic process according to the invention is therefore of the order of 104 kbits.

It should be noted that this value is only illustrative. It may be higher for subscribers having more random movements, or smaller for subscribers having more stable movements.

Where a nominal location register HLR contains 150,000 to 300,000 subscribers, the total necessary memory size to be added is of the order of 15.6 gigabits in order to manage 150,000 subscribers or 31.2 gigabits in order to manage 300,000 subscribers.

It is clear that the profile L3 thus determined is fixed, and in the face of changes in subscriber behaviour does not afford a totally satisfactory solution in the location of subscribers.

It is therefore advisable to provide for an update of the profile L3.

In order to allow updating of the profile L3, provision is made according to the invention for constructing, in the mobile telephone set operating mode, a work file MAJ (FIG. 5A), similar to the STAT file used for the initial construction of the profile L3, which will be managed at the nominal location recording means HLR during a period following the initial observation period.

The only difference between the file STAT and the file MAJ is in the absence of certain daily chronological periods PCkj corresponding to the case where the mobile telephone set, since it was in operating mode in one of the location zones of the file STAT during the corresponding daily chronological period PCkj, did not gain attention from the recording means.

In other words, the file MAJ contains events corresponding to location zones visited by the mobile telephone set in operating mode and not recorded in the file STAT during the initial observation period.

For example, the file MAJ contains data relating to the fact that the mobile telephone set entered the location zone with identity Nation at 08:40 on Monday and left it at 18:20.

Since this data was not recorded in the file STAT during the initial observation period, this data should be processed in accordance with the algorithm described with reference to FIGS. 4A, 4B and 4C in order to update the profile L3.

The result of this update is shown in the form of list L4 (FIG. 5B).

By way of example, the file MAJ here contains the data relating to the last 7 days of operation of the mobile telephone set.

It should be noted that this period m is at the discretion of the operator.

Advantageously, updating of the profile L3 is carried out every m days.

It should be noted that an updating of the profile L3 at the nominal location register HLR automatically leads to an updating of the profile L3 stored in the mobile telephone set (downloading of the new version of the profile for example).

In practice, on construction of the new profile L3 taking into account L4 updates, the denominator of the recurrences is now the value m (corresponding to the number of observation days for the update).

Thus, in the case where, for a particular weekly chronological period, the sum of the probabilities of new location zones is significant (greater than 50% for example), the subscriber is observed again (as on construction of the profile L3) during the weekly chronological periods in which the newly selected location zones appear.

Furthermore, besides long term data, that is those contained in the so-called fixed profile L3, a so-called dynamic profile advantageously integrates short term data taking into account recent data concerning location of the user.

For example, a call received or issued by the mobile subscriber allows the location system to recognise the position of the user and take account of it during the greater or lesser period following the time of this data.

Furthermore, in order to increase the intelligence of the radiotelephonic process according to the invention, provision is made for using general data to predict the movements of subscribers. These general data may relate to cartography giving the position of the geographic zones with respect to each other, data relating to road traffic in order to predict the progress of a subscriber on his customary route according to traffic flow, or data relating to meteorology, for example the temperature which may have an influence on the means of transport used and therefore on the itinerary followed.

It should be noted that in the description above, the structure of the fixed profiles is very simple.

In fact, they are linear whereas, as a variant, a tree structure, for example, could allow the usefulness of the data held by the recording means to be increased.

As seen above, initialisation of the fixed profile L3 of a subscriber is carried out during a greater or lesser period that may be set at one week or one month, consecutive to the subscriber's subscription. This initialisation may also be carried out manually by the subscriber.

Advantageously, in order to keep the process transparent to the user, the system itself automatically generates statistics on the movements of the subscriber.

This result is obtained by following the movements of the user during an observation period, using a process analogous to the one used in MSG where the system records the subscriber's location zone changes.

It should be noted that the end of the observation period must correspond to the time at which the process has acquired sufficient accuracy for at least one of the fixed profile couplets ai, fi.

Updating of the fixed profiles may be carried out automatically as soon as the functions fi are modified significantly. This modification occurs when the subscriber is recorded frequently outside the geographic zone previously stored in the fixed profile.

Where the system also uses dynamic profiles, it is advantageously possible to take into account the movements of the user in the short or medium term.

As for the fixed profile, the basic method for constructing a dynamic profile consists of recording the times, in hours and minutes, and location zone identity of the last connection of the subscriber to the network.

For example, let TA be a time at which the subscriber was located in location zone AA. At time TB, the user receives a call.

If TB−TA×VA, where VA is the speed of movement of the mobile, is less than or equal to DA, where DA is a predetermined distance, for example 1.5 times the mean radius of a location zone, then the process according to the invention will transmit search notifications in zone AA first, then if necessary in the zones round about and finally, in the event of negative location, in the other zones of the dynamic profile.

The general data referred to above advantageously enable the dynamic profile to be adjusted, that is reorganized, by modifying the values of fi.

As seen above, the size of a profile occupies a size of the order of 32 kbits; it is therefore possible to store this profile on a so-called SIM ("Subscriber Identity Module") card in the MSG application to which a memory of sufficient size, 32 kbits in the example, is advantageously added.

Downloading of the profile from the recording means HLR to the SIM card may of course be carried out by establishing a call connection from the network to the mobile and using an appropriate data exchange service.

The characteristics of the service are specified in the set-up field sent at the time of the connection request. The invention requires knowledge of the current time (day, hour and minute) at the mobile telephone set.

This knowledge may be obtained in an appropriate manner, for example simply by broadcast of this data, for example by the short message broadcast services (Short Messages Cell Broadcast) by each base station BS.

In this case the channel used is the CBCH channel (Cell Broadcast Channel).

Because of knowledge of the current time and of the identity of the current location zone, the mobile telephone set has available the data necessary for requesting the automatic updating of the profile L3 stored in a non-volatile manner in a suitable memory such as the SIM card.

This automatic update request is carried out in the following manner according to the invention.

For example, on power-up, the mobile telephone set listens to the watch channel and receives on this channel the current location zone identity broadcast by the base stations situated in the location zone where the mobile telephone set is situated.

In response to the identity thus received, the mobile telephone set selects, according to the current time, a weekly chronological period from the profile L3, and searches in the list of location zone daily identities assigned to that weekly chronological period to see if the identity thus received belongs to the list thus selected.

In the event of positive membership, no operation is carried out by the mobile telephone set while in the event of negative membership, a location update request is executed in accordance with MSG protocol.

Figure 6:
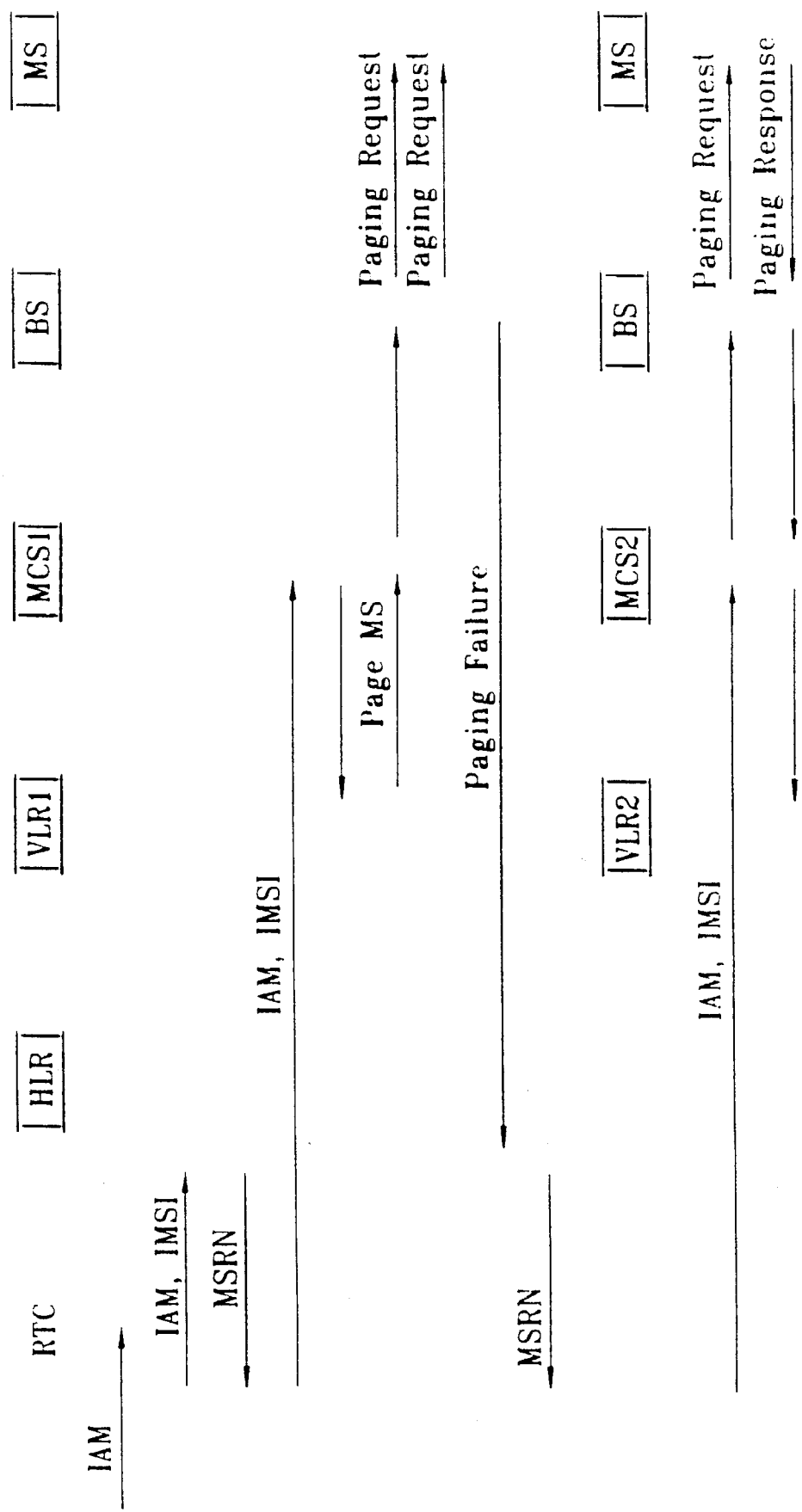
FIG. 6 is a flowchart illustrating the process for locating mobile subscribers according to the invention in an MSG type installation.

The location of subscribers according to the invention in the MSG case (FIG. 6) will now be described.

First of all, it should be noted that for use of the invention in an MSG type installation, the MSG protocol should be modified slightly on location updating.

In fact, the location updating process in the case of a change of location zone within the same visitor location register must be transferred according to the invention to the nominal location register HLR.

In other words, instead of the usual MSG process, provision is made for storing the location zone change in the nominal location recording means HLR, even if this occurs within the same visitor location register VLR.

As a result of this slight modification, the process allows the history of journeys to be kept in terms of identities of location zones visited and of the times at which the location zone changes took place.

It should be noted that the construction and updates of the profile of a subscriber are made at the nominal location register HLR and never at the mobile.

Briefly, the location of mobile subscribers in a MSG type installation is carried out in the following way.

In response to a call request IAM (standing for "Initial Address Message") directed to the mobile telephone set MS with subscriber identity IMSI, the nominal location recording means HLR indicate, by means of the message MSRN "Mobile Subscriber Roaming Number" to the telephone communication network RTC, the mobile service switching centre MSC1 which manages the location zone, the identity of which was selected in the profile L3 according to the invention.

That is to say the identity of the location zone having the highest probability in the list L3 for the weekly chronological period corresponding to the instant of the call.

In response to a message coming from the MSC1 centre, the visitor location register VLR sends the search message "page MS" in each of the base stations of the location zone thus selected, which each transmit the message "paging request".

The location process in the event of failure is terminated by the message "Paging Failure". For example this "paging failure" message is sent in response to a certain time delay or after a failure repeated a predetermined number of times in this location zone.

In the event of negative location, in response to the "paging failure" message, the recording means HLR broadcast another "PAGE MS" search message in another location zone selected in the profile L3 according to the invention.

That is to say the identity of the location zone of rank below that having the highest probability in the list L3 for the weekly chronological period corresponding to the instant of the call.

The mobile telephone set MS hears the search notification if it is in the location zone thus selected.

In the event of positive location, the telephone set establishes telephone communication with the caller according to the standard MSG protocol by sending the message "Paging Response".

It should be noted that, in the search process at the nominal location register HLR, on receipt of the subscriber search request, provision is made for sequentially examining the location zone list of the profile L3 for a particular weekly chronological period. Searching commences in the location zone situated at the head of the list (highest probability). If a "paging failure" message is received after searching in the first location zone, searching continues in the second location zone of the list and this is repeated if necessary until the last location zone recorded in the profile for the weekly chronological period concerned.

Determination of the particular weekly chronological period is carried out from the available current time in a suitable manner at the nominal location register HLR.

As a variant, transmission of the search notification message is carried out simultaneously in the location zones the identities of which appear in the profile L3 for a particular weekly chronological period.

What is claimed is:

1. A radiotelephonic process comprising the steps of:
   a) providing at least one mobile telephone set for a predetermined mobile subscriber having a predetermined mobile subscriber identity, the mobile telephone set being for use in intercommunication with fixed telephone sets connected to a fixed telephone communication network;
   b) providing radio coverage from at least one base station for a plurality of geographic location zones, each of the geographic location zones having a predetermined identity;
   c) providing recording means connected to the base station and containing data relating to the identity of the mobile subscriber and to an identity of a current location zone of the mobile telephone set;
   d) at the recording means, generating a profile for the mobile subscriber the profile including a list of couplets, each couplet indicating a location zone identity and a function with at least one operand giving a probability of locating the subscriber in an indicated location zone at a given instant, and storing the profile thus generated in the recording means;
   e) after storing the profile, in response to a telephone call request directed to the mobile subscriber, interrogating the recording means in order to select from the profile, in accordance with the at least one operand, a first location zone identity with a highest probability of locating the subscriber therein, and broadcasting a search message in the location zone with the first location zone identity;
   f) in an event of a positive location, receiving the search message at the mobile telephone set and, in response, establishing of radiotelephone intercommunication with a caller, while in an event of negative location, broadcasting the search message in another location zone determined by a routing means;
   g) wherein the profile is generated from data recorded in the recording means, in the form of a first work file, and obtained during movements of the mobile subscriber during a first predetermined observation period, the data recorded in the recording means relating to a plurality of daily chronological periods spanning the first predetermined observation period and each of the chronological periods having a start time determined by a time at which the mobile subscriber entered a location zone of one identity, and an end determined by a time at which the mobile subscriber left the location zone of the one identity and entered a location zone of another identity;

wherein, from the first work file, provision is made, at the recording means, to execute a processing algorithm comprising the steps of:
   i) constructing, from the start and end times of the plurality of daily chronological periods in the first work file, a list of successive weekly chronological periods, a first weekly chronological period having a start time of value greater than or equal to 00:00 and an end time corresponding to an end time of a daily chronological period of the first work file having a smallest value among the end times of the daily chronological periods of the first work file, and a last weekly chronological period having an end time of value less than or equal to 23:59 and a start time corresponding to a start time of a daily chronological period having a largest value among the start times of the daily chronological periods of the first work file, a daily identity of a location zone corresponding to the daily chronological period being assigned to each weekly chronological period;
   ii) by searching data of the first work file, obtaining different location zone daily identities assigned for each weekly chronological period thus constructed;
   iii) counting a recurrence of each location zone daily identity for each weekly chronological period; and
   iv) ordering the different location zone daily identities according to their recurrence for each weekly chronological period.

2. A radiotelephonic process as recited in claim 1, further comprising the steps of:
   in the mobile telephone set constructing a second work file, substantially similar to the first work file, and containing data relating to daily chronological periods and to location zone identities recorded during a second predetermined period which follows the first observation period of the first work file and not recorded in the said first work file during the first observation period; and
   processing the second work file in accordance with steps (i) to (iv) in order to update the profile.

3. A radiotelephone installation comprising:
   at least one mobile telephone set for a predetermined mobile subscriber having a predetermined mobile subscriber identity, the mobile telephone set being for intercommunication with fixed telephone sets connected to a fixed telephone communication network;
   at least one base station for each of a plurality of geographical location zones to provide radio coverage for each geographic location zone, each geographic location zone having a predetermined identity;
   recording means connected to the base station for storing data relating to the identity of the subscriber and an identity of a current location zone of the mobile telephone set;
   at the recording means, processing means for generating a profile for the mobile subscriber the profile including a list of couplets, each couplet indicating a location zone identity and a function with at least one operand giving a probability of locating the subscriber in an indicated location zone at a given instant, and storage means suitable for storing the profile thus generated;
   wherein the processing means are arranged to generate the profile from data recorded in the recording means in the form of a first work file and obtained in the course of movements of the mobile subscriber during a first predetermined observation period, the data recorded in the recording means relating to a plurality of daily chronological periods spanning the first predetermined observation period and each of the daily chronological periods having a start time determined by a time at which the mobile subscriber entered a location zone of one identity, and an end time determined by a time at which the mobile subscriber left the location zone of one identity and entered a location zone of another identity; and
   wherein, from the first work file, the recording means:
   i) constructs, from the start and end times of the plurality of daily chronological periods in the first work file, a list of successive weekly chronological periods, a first weekly chronological period having a start time of value greater than or equal to 00:00 and an end time corresponding to an end time of a daily chronological period of the first work file having a smallest value among the end times of the daily chronological periods of the first work file, and a last weekly chronological period having an end time of value less than or equal to 23:59 and a start time corresponding to a start time of a daily chronological period having a largest value among the start times of the daily chronological periods of the first work file, a daily identity of a location zone corresponding to the daily chronological period being assigned to each weekly chronological period;

ii) by searching data of the first work file, obtains different location zone daily identities assigned for each weekly chronological period thus constructed;

iii) counts a recurrence of each location zone daily identity for each weekly chronological period; and iv) orders the different location zone daily identities according to their recurrence for each weekly chronological period.

* * * * *